United States Patent
Illiadis et al.

(10) Patent No.: US 6,614,762 B1
(45) Date of Patent: Sep. 2, 2003

(54) PNNI TOPOLOGY ABSTRACTION

(75) Inventors: Ilias Illiadis, Rueschlikon (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,443

(22) Filed: Jul. 30, 1999

(30) Foreign Application Priority Data

Aug. 10, 1998 (EP) .............................................. 98114966

(51) Int. Cl.$^7$ ............................................... G01R 31/08
(52) U.S. Cl. ....................................... 370/252; 370/254
(58) Field of Search ................................ 370/252, 395, 370/395.1, 395.3, 395.31, 395.32, 389, 351, 354, 237, 238, 238.1, 400, 406, 405, 404, 403, 401, 254, 256, 258, 229, 468

(56) References Cited

U.S. PATENT DOCUMENTS 6,201,810 B1 * 3/2001 Masuda et al. ............. 370/395
6,370,119 B1 * 4/2002 Basso et al. ................ 370/252

FOREIGN PATENT DOCUMENTS

EP      0781007     6/1997

OTHER PUBLICATIONS

Anthony Alles, "ATM Internetworking", dated May 1995, Published by Cisco Systems, Inc, pp. 16–18.*
Iwata A et al: "ATM Routing Algorthms with Multiple QOS Requirements for Multimedia Internetworking" IEICE Transactions on Communications, vol. E79–B, No. 8, Aug. 1996, pp. 999–1007, XP000628636 *paragraph 2.2; figure 3 *paragraph 3—paragraph 3.4.

Venkateswaran R et al: "Hierarchical Multicast Routing in ATM Networks" 1996 IEEE International Conference on Communications (ICC), converging Technologies for Tomorrow's Applications Dallas, Jun. 23–27, 1996, vol. 3, Jun. 23, 1996, pp. 1690–1964, XP000625096 Institute of Electrical & Electronics Engineers *Abstract.

(List continued on next page.)

*Primary Examiner*—Douglas Olms
*Assistant Examiner*—Robert W. Wilson
(74) *Attorney, Agent, or Firm*—John D. Flynn; George E. Grosser

(57) ABSTRACT

Scheme for the computation of a restrictive cost between pairs of border nodes of a PNNI peer group. A list of said links sorted according to their restrictive cost C is maintained. Logical sets of nodes are formed by taking one link after the other from said list starting with the cheapest cost C and assigning an identifier to the two nodes connected by the respective link, whereby the nodes of a set of nodes carry a dominant unique identifier if a border node is a member of the respective set, or a unique identifier if there is no border node being a member of the respective set. Sets are united if a link connects a node of a first set and a node of a second set, by assigning a dominant unique identifier to all nodes of both sets if either nodes of the first or the nodes of the second set carry a dominant unique identifier, or by assigning a unique identifier to all nodes of both sets if neither the nodes of the first nor the nodes of the second set carry a dominant unique identifier. A Matrix update algorithm is applied if the link connects a node of a first set and a node of a second set that both already carry dominant unique identifiers.

19 Claims, 11 Drawing Sheets

| Edge | $C_r^s(.)$ | Src Vertex | Dst Vertex |
|---|---|---|---|
| 0 | 5 | 0 | 2 |
| 1 | 10 | 5 | 8 |
| 2 | 15 | 2 | 5 |
| 3 | 20 | 4 | 5 |
| 4 | 25 | 5 | 6 |
| 5 | 30 | 1 | 9 |
| 6 | 35 | 2 | 3 |
| 7 | 40 | 6 | 9 |
| 8 | 45 | 0 | 1 |
| 9 | 50 | 3 | 4 |
| 10 | 55 | 7 | 8 |
| 11 | 60 | 1 | 2 |
| 12 | 65 | 0 | 3 |
| 13 | 70 | 2 | 6 |
| 14 | 75 | 6 | 7 |
| 15 | 80 | 5 | 7 |

OTHER PUBLICATIONS

Juhro Takse: "A Characteristic of Primary Distributed–Type Switching Network" Electronics & Communications in Japan, Part I—Communications, vol. 75, No. 9, Sep. 1, 1992, pp. 1–14, XP00035434 *paragraph 1.

Iwata A et al: "ATM Routing Algorithms with Multiple QOS Requirements for Multimedia Internetworking": Aug. 1996: para. 2.2, 3–3.4, fig.3 : IEICE Transactions on Communications on Communications, vol. E79–B, No. 8, Aug. 1996, pp. 999–1007, XP000628636.

Venkateswaren R et al: "Hierarchical Multicast Routing in ATM Networks": Jun. 23–27, 1996 : Abstract : 1996 IEEE International Conference on Communications (ICC), Converging Technologies for Tomorrows Applications, Dallas, Jun. 23–27, 1996, vol. 3, Jun. 23, 1996, pp. 1690–1964, XP000625096 IEEE.

Juhro Takse: "A Characteristic of Primary Distributed–Type Switching Network" :Sep. 1, 1992: para. 1 :Electronics & communications in Japan, Part I—Communications, vol. 75, No. 9, Sep. 1992, pp. 1–14, XP00035434.

Dimitrijevic DD et al: Routing in Multiple Domain Networks : Apr. 23, 1989 : Abstract :Technology—Emerging of Converging?, Ottawa, Apr. 23–27, 1989, pp. 1047–1056, XP00076759, IEEE.

* cited by examiner

FIG. 2
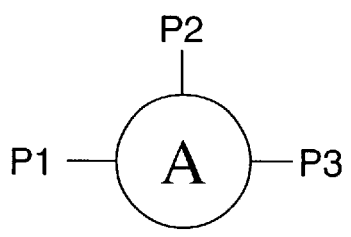
simple node representation
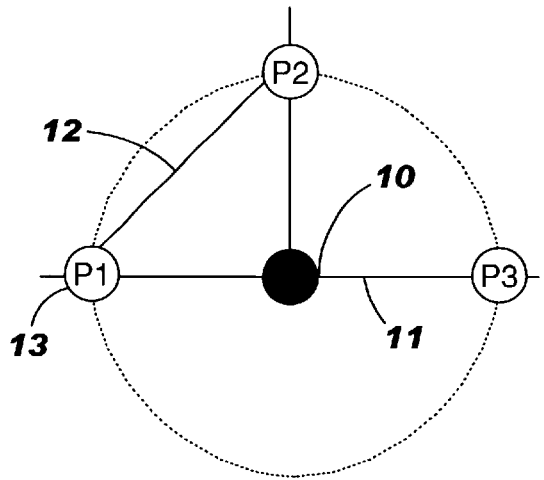
complex node representation

| Edge | $C_r^s(.)$ | Src Vertex | Dst Vertex |
|---|---|---|---|
| 0 | 5 | 0 | 2 |
| 1 | 10 | 5 | 8 |
| 2 | 15 | 2 | 5 |
| 3 | 20 | 4 | 5 |
| 4 | 25 | 5 | 6 |
| 5 | 30 | 1 | 9 |
| 6 | 35 | 2 | 3 |
| 7 | 40 | 6 | 9 |
| 8 | 45 | 0 | 1 |
| 9 | 50 | 3 | 4 |
| 10 | 55 | 7 | 8 |
| 11 | 60 | 1 | 2 |
| 12 | 65 | 0 | 3 |
| 13 | 70 | 2 | 6 |
| 14 | 75 | 6 | 7 |
| 15 | 80 | 5 | 7 |

FIG. 5

| Vertex | 0 | 1 | 2 | 3 | 4 | 5 | 6 | 7 | 8 | 9 |
|---|---|---|---|---|---|---|---|---|---|---|
| $C(.)$ | ∞ | 0 | ∞ | 1 | ∞ | ∞ | ∞ | 2 | ∞ | ∞ |

FIG. 6

| Vertex | 0 | 1 | 2 | 3 | 4 | 5 | 6 | 7 | 8 | 9 |
|---|---|---|---|---|---|---|---|---|---|---|
| $C(.)$ | [3] | 0 | [3] | 1 | ∞ | ∞ | ∞ | 2 | ∞ | ∞ |

FIG. 7

| Vertex | 0 | 1 | 2 | 3 | 4 | 5 | 6 | 7 | 8 | 9 |
|---|---|---|---|---|---|---|---|---|---|---|
| $C(.)$ | 3 | 0 | 3 | 1 | ∞ | [4] | ∞ | 2 | [4] | ∞ |

FIG. 8

| Vertex | 0 | 1 | 2 | 3 | 4 | 5 | 6 | 7 | 8 | 9 |
|---|---|---|---|---|---|---|---|---|---|---|
| $C(.)$ | 3 | 0 | 3 | 1 | ∞ | [3] | ∞ | 2 | [3] | ∞ |

| Vertex | 0 | 1 | 2 | 3 | 4 | 5 | 6 | 7 | 8 | 9 |
|---|---|---|---|---|---|---|---|---|---|---|
| $C(.)$ | 3 | 0 | 3 | 1 | [3] | 3 | ∞ | 2 | 3 | ∞ |

| Vertex | 0 | 1 | 2 | 3 | 4 | 5 | 6 | 7 | 8 | 9 |
|---|---|---|---|---|---|---|---|---|---|---|
| $C(.)$ | 3 | 0 | 3 | 1 | 3 | 3 | [3] | 2 | 3 | ∞ |

| Vertex | 0 | 1 | 2 | 3 | 4 | 5 | 6 | 7 | 8 | 9 |
|---|---|---|---|---|---|---|---|---|---|---|
| $C(.)$ | 3 | 0 | 3 | 1 | 3 | 3 | 3 | 2 | 3 | [0] |

| Vertex | 0 | 1 | 2 | 3 | 4 | 5 | 6 | 7 | 8 | 9 |
|---|---|---|---|---|---|---|---|---|---|---|
| $C(.)$ | [1] | 0 | [1] | 1 | [1] | [1] | [1] | 2 | [1] | 0 |

FIG. 13

Algorithm:

```
while (E_ToVisit ≠ {0}) do
    E := GetFirstEdge(E_ToVisit);
    V_s := GetSrcVertex(E);
    V_d := GetSDstVertex(E);
    switch on C(V_s) = C(V_d) = ∞ do
        case C(V_s) = C(V_d) = ∞ do
            C(V_s) := GetNewColor(); C(V_d) := C(V_s);
        done
        case C(V_s) ∈ F and C(V_d) ∈ F and C(V_s) ≠ C(V_d) do
            V_x := GetOriginatingVertex(C(V_s));
            V_y := GetOriginatingVertex(C(V_d));
            if M[V_x][V_y] = ∞ do
                for i ∈ B and i ≠ V_y do
                    if M[i][V_x] ≠ ∞ do
                        for j ∈ B and j ≠ V_x do
                            if M[V_y][j] = ∞ do
                                M[i][j] := C_r^S(E);
                                M[j][i] := C_r^S(E);
                            done
                        done
                    done
                done
                if ∀ i, j M[i][j] ≠ ∞ do
                    STOP,
                done
            done
        done
        case C(V_s) ≠ ∞ and C(V_d) ≠ ∞ do
            for all vertices v such that C(v) = max[C(V_s),C(V_d)] do
                C(v) := min[C(V_s),C(V_d)];
            done
        done
        case C(V_s) ∈ F and C(V_d) ∉ F or C(V_s) ∉ F and C(V_d) ∈ F do
            for all vertices v such that C(v) = max[C(V_s),C(V_d)] do
                C(v) := min[C(V_s),C(V_d)];
            done
        done
        case C(V_s) = ∞ and C(V_d) ≠ ∞ or C(V_s) ≠ ∞ and C(V_d) = ∞ do
            C(V_s) := min[C(V_s),C(V_d)]; C(V_d) := C(V_s);
        done
    done
done
```

PNNI TOPOLOGY ABSTRACTION

TECHNICAL FIELD

The invention concerns the computation of complex node representations and the calculation of a path in a PNNI network.

BACKGROUND OF THE INVENTION

For asynchronous transfer mode (ATM) switches to communicate, a standards-based signalling and routing protocol called Private Network-to-Network Interface (PNNI) is used. PNNI is a comprehensive routing and signalling protocol for use in an ATM network and is a comprehensive signalling standard. Among the major characteristics are signalling for switched virtual circuits (SVCs) and dynamic routing capabilities. It also supports the Quality of Service (QoS) parameters. PNNI was approved by the ATM Forum in 1996 and is found in many ATM systems.

PNNI supports a dynamic information exchange to allow switches to update routing paths and to form alternate rerouting in case of link failure.

In order to support bandwidth request and QoS, a local PNNI switch has to know the network topology. Knowing whether the network can support end-to-end QoS (for example the required bandwidth) and whether the path is available are the only ways the local switch can accept a call without compromising the call integrity. Such information can be established manually when the network is formed. However, having to inform every switch on the network when a new switch is added or when the topology changes is very labor intensive, not to mention the increasing probability for errors. The only effective process is to have the switches exchange information with one another on a regular basis. PNNI requires such an exchange of information as discussed in the next section.

Topology information is exchanged automatically on a regular basis or upon significant changes to ensure that every switch in the network has the most current view. Switches form peer groups under common ATM prefix. A peer-group-leader (PGL) is elected in each peer group to represent the peer group at a higher layer. The PGL does not have to be the connecting node between two peer groups. An efficient procedure governs the frequency and the amount of information being exchanged so that bandwidth is conserved. If update information is received by a switch, it is compared with the existing topology information and changes will automatically be updated. The effect of the information exchange is to increase the ability to reach the destination. By providing alternate rerouting, if a commonly used path fails, an alternate path, if available, will be used to reach the destination. Only by having updated topology information can switches be relied on to make such distributed intelligent decisions.

To reduce the overall complexity, the amount of needed memory, and the path selection complexity in particular, PNNI uses the hierarchical model for topology aggregation, as indicated above. At various levels of this hierarchy, a PNNI peer group is represented one level up by a single node.

PNNI is a hierarchical, link-state routing protocol that organizes switching systems into logical collections called peer groups. Neighboring call establishment in PNNI consists of two operations: the nodes form a peer group by exchanging their peer group identifiers (PGIDs) via Hello packets using a protocol that makes nodes known to each other. If the nodes have the same PGID, they belong to the peer group defined by that particular PGID; if their PGIDs are different, they belong to different peer groups. A border node has at least one link that crosses the peer group boundary. At upper layer (between logical group nodes) hello protocol exchanges occur over logical links called SVCC-based routing control channels (SVCC-RCCs). SVCC stands for switched virtual connection channel. PNNI defines the creation and distribution of a topology database that describes the elements of the routing domain as seen by a node. This topology database provides all the information required to compute a route from the node to any address that is reachable in, or through that routing domain. Nodes exchange database information using PTSEs (PNNI Topology State Elements). PTSEs contain topology characteristics derived from link or node state parameter information. The state parameter information could be either metrics or attributes. PTSEs are grouped to form PTSPs (PNNI Topology State Packets) which are flooded throughout the peer group so that all nodes in one peer group will have an identical topology database. As mentioned already, every peer group has a node called PGL. There is at most one active PGL per peer group. The PGL will represent the current peer group in the parent peer group as a single node called logical group node (LGN). The LGN will also flood the PTSEs in the parent peer group down to the current peer group. Apart from its specific role in aggregation and distribution of information for maintaining the PNNI hierarchy, the PGL does not have any special role in the peer group.

Call establishment in PNNI consists of two operations: the selection of an optimal path and the setup of the connection state at each point along that path. To provide good accuracy in choosing optimal paths in a PNNI network, the PNNI standard provides a way to represent a peer group with a structure which is more sophisticated than the single node. This representation is called 'complex node representation'. It allows advertisement of the cost of traversing this node and therefore the cost of traversing the whole peer group summarized by the respective complex node representation.

The computation of complex node representations and the aggregation and distribution of information for maintaining identical databases within a peer group and between peer groups is very complex and time consuming in particular when dealing with large networks. In other words, the path calculation becomes slower with increasing size of a network and topology updates use up more and more of the node's and link's capacity.

It is an object of the present invention to provide a fast and reliable method for the computation of complex node representations.

It is an object of the present invention to provide a fast and reliable method for the calculation of a path in a PNNI network.

It is another object of the present invention to provide a method for selection of an optimal path in a PNNI network.

It is a further object to provide improved PNNI nodes and PNNI networks.

SUMMARY OF THE INVENTION

The present invention concerns a scheme for the computation of a restrictive cost between pairs of border nodes of a PNNI peer group which comprises nodes, some of the nodes being border nodes. The peer group further comprises links connecting pairs of nodes. The following steps are carried out to compute the restrictive cost:

a. maintaining a sorted list of said links sorted according to their restrictive cost C, b. forming logical sets of nodes by taking one link after the other from said list starting with the cheapest cost C and assigning an identifier to the two nodes connected by the respective link, whereby the nodes of a set of nodes carry a dominant unique identifier if a border node is a member of the respective set, or a unique identifier if there is no border node being a member of the respective set, uniting two sets, if such a link connects a node of a first set and a node of a second set, by assigning a dominant unique identifier to all nodes of both sets if either nodes of the first or the nodes of the second set carry a dominant unique identifier, or by assigning a unique identifier to all nodes of both sets if neither the nodes of the first nor the nodes of the second set carry a dominant unique identifier, c. applying a matrix update algorithm if said link connects a node of a first set and a node of a second set that both already carry dominant unique identifiers.

The present scheme can be employed in any kind of network devices, such a routers for example. The scheme can also be used for computation of an optimal path in a PNNI network, or for routing a packet or frame from a source node to a destination node using an optimal path in a PNNI network.

The advantages of the present invention are addressed in the detailed description.

DESCRIPTION OF THE DRAWINGS

The invention is described in detail below with reference to the following schematic drawings. It is to be noted that the Figures are not drawn to scale.

FIG. 2 are two different forms of representations used in connection with PNNI.

FIGS. 5–12 are schematic representations used to illustrate and explain various steps of the scheme, in accordance with the present invention.

FIG. 13 is a schematic representation of a simple graph used to illustrate aspects of the invention.

FIG. 14 is a sample algorithm which is well suited for use in connection with the present invention.

Figure 1:
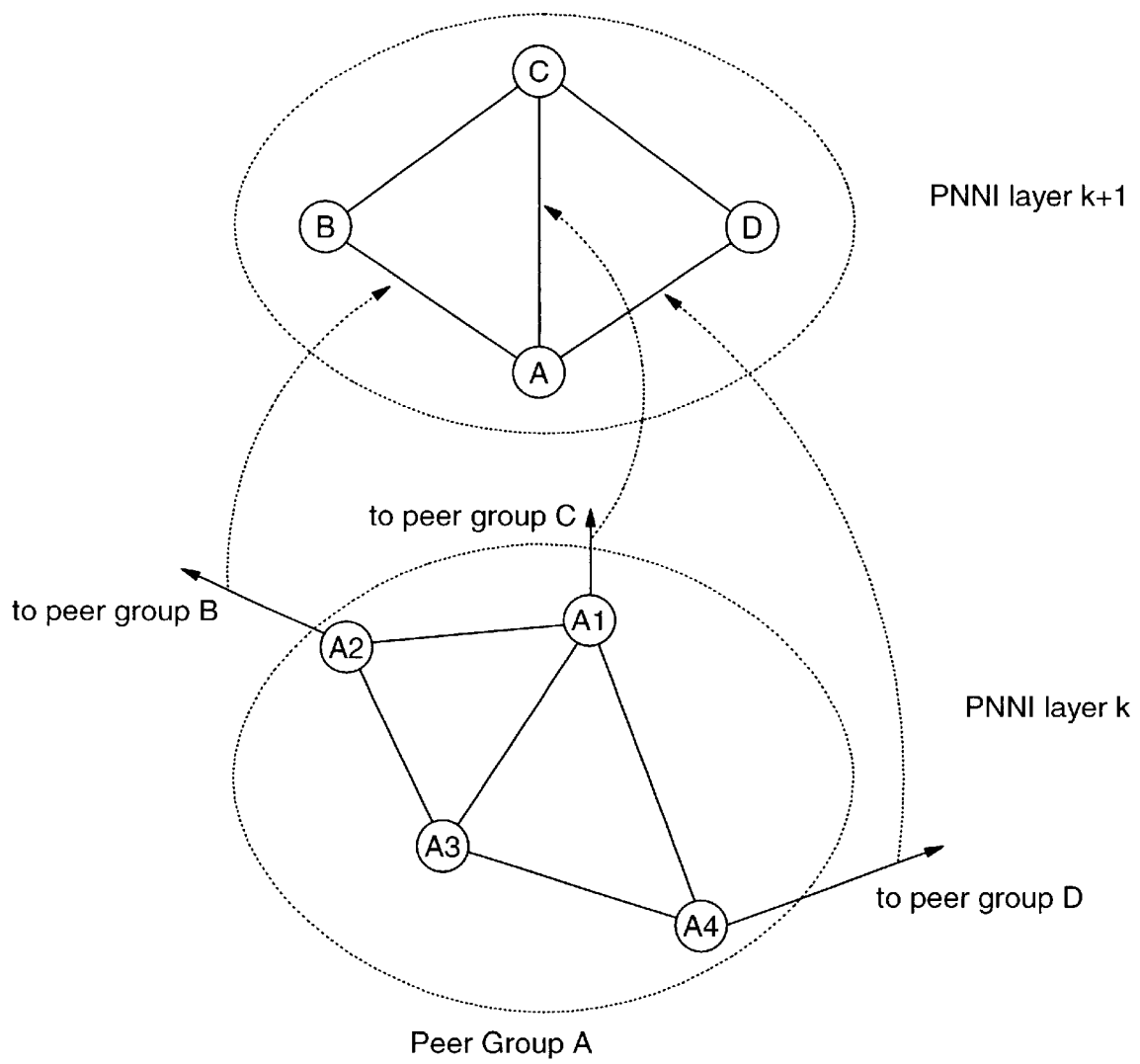
FIG. 1 is a schematic representation of a PNNI network used to explain the PNNI hierarchy.

DESCRIPTION OF PREFERRED EMBODIMENTS:

The basic concept of the present invention is described in the following. Before addressing different embodiments, relevant terms and expressions are defined and explained.

The expression "restrictive cost" is herein used to describe cost as a function of a link's dimension or characteristic, such as the bandwidth for example. The restrictive cost C can, for example, be defined as C=Max-bandwidth, or as C=1/bandwidth, for example. According to the definition of restrictive cost, the weakest link of a path defines the cost. The opposite of restrictive costs are additive costs which depend for example on the delay of links.

The words "node" or "vertex" are herein used as generic term for routers, switches, bridges, brouters, and any other system that transmits or receives information.

The word "database" is used to describe tables, listings, or any other collection of data. Such a database can either be located within one and the same memory, or it can be distributed.

The word "identifier" herein means color, marking, flag, connectivity identifier, number, letter and the like. The "identifiers" are herein used to distinguish sets, as will become apparent later.

A "set" comprises one or multiple nodes. There is only one border node in a set.

A network can be modeled by an oriented graph. The following conventions will be used:

A node of the network will be referenced as a vertex of the graph.

A link between two network nodes will be referenced as an edge between two vertices of the graph.

Let G(V, E) be the graph representing the network at a given point in time. V is a set of vertices and E a set of directed edges. Therefore, for all $v_i, v_j \in V$ if $v_i$ and $v_j$ are connected, the edge $$v_i \xrightarrow{\varepsilon_{v_i,v_j}} v_j \in E.$$

Let $v_x$ and $v_y$ be two vertices of graph G(V, E). The path $$v_x \xrightarrow{P_{x,y}} v_y$$

is a sequence of n vertices such that:

$$\left\{ \begin{array}{c} P_0 = v_x \\ P_{n-1} = v_y \\ \exists \varepsilon_{P_i,P_{i+1}} \in E \, \forall \, i \in [0, \ldots, n-2] \end{array} \right\}$$

If the path does not exist, $P_{x,y}=\{\emptyset\}$. In this case the path is said to be not feasible. The length of the path $L(P_{x,y})$ is the number of edges in the path:

$$L(P_{x,y}) \triangleq \left\{ \begin{array}{cc} card(P_{x,y})-1 & \text{if } P_{x,y} \neq \{\emptyset\} \\ 0 & \text{otherwise.} \end{array} \right\}$$

Let us associate a restrictive cost to an edge. For an edge $\varepsilon_{84\ i,vj} \in E$, such a cost will be $Cr(\varepsilon_{84\ i,vj}) \in N$. (To be more general one could consider that $Cr(\varepsilon_{84\ i,vj}) \in R^+$. However, since the PNNI protocol allows only integer representations, in the following only integer values will be considered). It is to be noted, however, that the present invention can also be applied to non-integer costs. The cost is said to be restrictive since the restrictive cost of a path will be the maximum of the restrictive costs of the traversed edges.

Therefore for a feasible path from $v_x$ to $v_y$ of length n, $P_{x,y}$, the restrictive cost of such a path will be:

$$C_r(P_{x,y}) = \max_{i \in [0,n[} \{C_r(\varepsilon_{P_i,P_{i+1}})\}.$$

If the path is not feasible, then $C_r(P_{x,y})=\infty$. It is possible to the define the restrictive cost of an edge in both directions: $C_r^f(P_{vi,vj})=C_r(\epsilon_{vi,vj})$ and $C_r^r(P_{vi,vj})=C_r(\epsilon_{vj,vi})$. At path level:

$$C_r^f(P_{x,y}) = \max_{i \in [0,n[} \{C_r(\varepsilon_{P_i,P_{i+1}})\} \text{ and,}$$

$$C_r^r(P_{x,y}) = \max_{i \in [0,n[} \{C_r(\varepsilon_{P_{i+1},P_i})\}.$$

Of course, if the path is not feasible, $C_r^f(P_{x,y})=C_r^r(P_{x,y})=\infty$. When computing optimal path, it is sometime sufficient to minimize a "symmetric" cost. That is, only one cost is associated to a path regardless the direction. In the case of directed edges, this requires a symmetrization step. Therefore for all edges $\epsilon_{vi,vj}$ of the graph a symmetric restrictive cost is considered: $C_r^s(\epsilon_{vi,vj})=C_r^s(\epsilon_{vj,vi})=\max \{C_r(\epsilon_{vi,vj}), C_r(\epsilon_{vj,vi})\}$ The extension to the path cost is straightforward.

$$C_r^s(P_{x,y}) = \max_{i \in [0,n[} \{C_r^s(\varepsilon_{P_i,P_{i+1}})\}.$$

Problem solved by the present invention:

The PNNI hierarchy is used to represent a whole PNNI peer group, e.g. peer group A in FIG. 1, with a single node A. This principle allows abstraction of the network topology and therefore path computation complexity is alleviated. FIG. 1 illustrates this mechanism. The PNNI peer group A at PNNI layer k is composed of four nodes. Three of them (A1, A2 and A3) have a special role since they each have a link connecting peer group A to other peer groups (outside links). Those nodes are designated as border nodes. When the topology is abstracted at PNNI layer k+1 (see uppermost part of FIG. 1) the peer group A is represented only by node A. The outside links are also shown at PNNI layer k+1.

The PNNI routing protocol authorizes two ways of representing a PNNI peer group at an upper layer:

As a simple node: This representation is simple to construct and to use. However, it does not permit a showing of the cost of traversing the peer group.

As a complex node: This representation shows the cost of traversing the peer group. It is therefore possible to take into account this cost at path selection time, or for other purposes. The drawbacks are of course increased complexity to generate this representations and also to use it when computing routes (since there are more vertices and edges then in the case of simple node representation).

Both representations are shown in FIG. 2. The simple node representation is given on the left hand side and the complex node representation on the right hand side of FIG. 2. The principle of this complex node representation is to map the simple node to a representation where:

The nucleus 10 is a vertex representing the node itself.

The nucleus 10 is connected via spokes 11 to a set of vertices (P1, P2, P3) 13 each one representing a port (note that a port in the present context is a connection to the outside links) in the simple node representation.

Optionally, vertices representing ports 13 can be directly connected by exception bypasses 12.

Note that spokes 11 and exception bypasses 12 are actually normal edges belonging to the graph. The problem is how to generate a complex node representation corresponding to a given peer group. Of course, this representation can be built for various kind of costs. Asymmetric costs versus symmetric costs can also be considered. In the present context, only symmetric restrictive costs are analyzed. An extension to other type of costs or the usage of asymmetric costs is possible.

Suppose that the peer group is represented by a graph G(E,V) having N vertices. This graph has M border vertices $b_0, \ldots, b_{m-1} \in V$ corresponding to the border nodes. The problem solved by the complex generation algorithm is to build the costs matrix summarizing the cost of traversing the peer group between each pair of border vertices. According to definitions presented earlier in the present text, the cost matrix is such that:

$$\begin{pmatrix} 0 & C_r^s(P_{b_0,b_1}) & \cdots & C_r^s(P_{b_0,b_{m-1}}) \\ C_r^s(P_{b_1,b_0}) & \cdots & \cdots & \cdots \\ \vdots & \vdots & \vdots & \vdots \\ C_r^s(P_{b_{m-1},b_0}) & \cdots & \cdots & 0 \end{pmatrix}$$

Since only symmetric costs are considered in the present context, the matrix is of course symmetric. This cost matrix is actually an algebraic representation of the complex node. Once the computation of the matrix has been completed there is a cost entry for each pair of border nodes of the PNNI peer group under consideration (note that if there are 5 border nodes in a PNNI group, the cost matrix is a 5×5 matrix). The cost matrix can be mapped to the actual complex node representation in two ways. The first approach is to use only exception bypasses. In this case the cost of the spokes is set to infinity. A fully meshed set of exception bypasses is used. Each exception bypass has for cost the appropriate entry in the cost matrix. The drawback of this approach is to significantly increase path selection algorithm complexity. The second approach is to use only spokes. Let $C_i$ $i=0, \ldots, m-1$ be the symmetric restrictive cost of spoke connecting port i to the nucleus. This costs are the solution of the linear system:
$$\begin{cases} \max(C_0, C_1) = C_r^s(P_{b_0,b_1}) \\ \vdots \\ \max(C_0, C_{m-1}) = C_r^s(P_{b_0,b_{m-1}}) \\ \vdots \\ \max(C_i, C_{i+1}) = C_r^s(P_{b_i,b_{i+1}}) \\ \vdots \\ \max(C_i, C_{m-1}) = C_r^s(P_{b_i,b_{m-1}}) \\ \vdots \\ \max(C_{m-2}, C_{m01}) = C_r^s(P_{b_{m-2},b_{m01}}) \end{cases}$$

Since it is possible to derive both representations (or a combination of the two) from the cost matrix, we herein focus only on the construction of this matrix.

The problem to be solved here is similar to the class of problems known as finding all pairs of shortest paths'. Several algorithm may be used to solve this problem as discussed by T. H. Cormen, C. E. Leiserson and R. L. Rivest in "Introduction to Algorithms", The MIT Press, 1989. Examples are the Floyd-Warshall algorithm or Johnson's algorithm. Actually, these algorithms are not directly suited for the present problems since they compute the pairs of optimal paths all vertices in the graph. The complexity of these algorithm is no lower than $O(n^2 Logn)$ (with Johnson's algorithm for sparse graphs) and usually in $O(n^3)$(Floyd-Warshall algorithm). Another approach would be to use by A.B. Przygienda in "Link State Routing with QoS in ATM LAN's", Ph.D. Thesis, Eidgenossische Technische Hochschule Zurich, p. 11051, 1995). In this case a widest path spanning tree is computed from each of the border vertices. The spanning trees are then "merged" to find the optimal path between each pair of border vertices. The complexity of such an approach is O(m n²). The inventive algorithm described in the following solves the problem with a complexity almost linear with the number of edges in the graph.

The proposed algorithm, illustrated in FIG. 13, is based on the minimum spanning tree growth suggested by Kruskal and Prim algorithms (as discussed in the above mentioned publication of T. H. Cormen). The basic principle is to add to a spanning tree (or spanning forest) the safest possible edge at each step. This guarantees that, at each step of its growth, the tree (or the forest) is minimal. This property is heavily used in the proposed algorithm.

In addition, a growth, graph coloring technique is used to identify spanning tree coming from the various border vertices.

Before addressing implementation details, the inventive algorithm (see FIG. 13) is addressed. The following definitions are used:

| | |
|---|---|
| $E_{ToVisit}$ | is the list of edges sorted by increasing cost |
| M | is the cost matrix |
| F | is the set of color used to identify border vertices |
| C(v) | is a color (an identifier) of a vertex |
| B | is the set of border vertices |

Used functions:

| | |
|---|---|
| GetFirstEdge(list) | gets and removes the first edge in list. |
| GetNewColor( ) | returns a color which is not in use. Colors are returned by increasing order. |
| ReleaseColor(c) | sets color c as not in use. |
| GetSrcVertex(e) | returns the source vertex of edge e. |
| GetDstVertex(e) | returns the destination vertex of edge e. |
| GetOriginatingVertex(c) | returns the border vertex associated to color c. |

Initializations:

F = {0};
C(.) = ∞;
M[.][.] = ∞;
for v ∈ β do
   C(v) := GetNewColor( );
   F := F ∪ C(v);
done.

Note that by initializing C to be "infinity", we define the respective paths not to be feasible.

In the following the sample graph in FIG. 3 is considered. The vertices with a bolded outline are the border vertices. The values shown on the edges are the symmetric restrictive costs C. The list of edges sorted by increasing cost is given in the table of FIG. 4. This list is herein referred to as sorted list of links. It is to be noted that there are different ways to represent the information contained in such a list. A simple example is shown in FIG. 4 where the entries (records) in the list are actually ordered by their cost C such that the link with the lowest cost comes first and the link with the highest cost is at the end of the list. It is obvious that there are other ways to represent this information. One example is a logical sorted list of links. In this case the actual entries (record) in the list are not ordered by cost. Pointers are used instead. Such a logical sorted list of links can be easily updated because only pointers need to be changed.

The lowest cost C in the graph of FIG. 3 is 5. The pair of vertices connected by the respective edge is 0 and 2. Note that the edges are numbered from 0–15 in the present example. The next lowest cost is 10. The link with the cost of 10 interconnects the pair of vertices 5 and 8. The link with the highest cost 80 is the one that interconnects vertices 5 and 7 (see last row of the list of FIG. 4).

The first step of the present algorithm consist in the initialization of the color of vertices and of the cost matrix. A unique color is assigned to each border vertex. Note that colors are used herein as identifiers. Other identifiers can be used instead. In the present example, the color 0 is assigned to border vertex 1, the color 1 to border vertex 3 and the color 2 to border vertex 7, as shown in FIG. 5. The identifiers assigned to these border nodes are unique within the PNNI peer group under consideration and are defined to be dominant. The color of all other vertices is infinity in the present example. Note that any other identifier is suited which allows to distinguish ordinary nodes from border nodes.

After initialization the vertices carry the colors as shown in the table of FIG. 5. The cost matrix now looks like.

$$\begin{pmatrix} & \text{vertex 1} & \text{vertex 3} & \text{vertex 7} \\ & \downarrow & \downarrow & \downarrow \\ \text{vertex 1} \rightarrow & 0 & \infty & \infty \\ \text{vertex 3} \rightarrow & \infty & 0 & \infty \\ \text{vertex 7} \rightarrow & \infty & \infty & 0 \end{pmatrix} \quad (1)$$

Now the actual processing starts by taking a first link from the sorted list which connects two nodes. This first link is the cheapest link with C=5. In the present implementation example the Edge 0 (first row) is taken from the sorted list of links in FIG. 4. It joins vertices 0 and 2 which both have "infinity" color in FIG. 5. The new color 3 is assigned to both of them, as shown in the table of FIG. 6. I.e., a new identifier (Color 3) is assigned to these two nodes if the two nodes are ordinary nodes. By doing so, a set S1 is defined (cf. FIG. 3B).

Figure 3A:
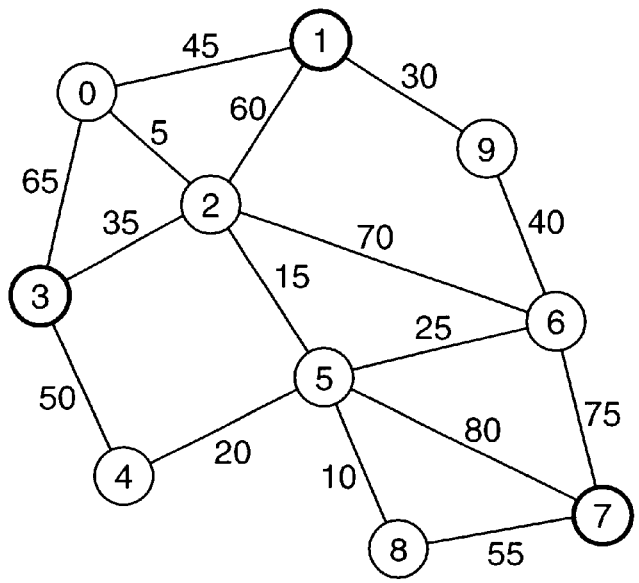
FIGS. 3A–3G are schematic representations of a sample graph used to illustrate and explain various steps of the scheme, in accordance with the present invention.
Figure 3B:
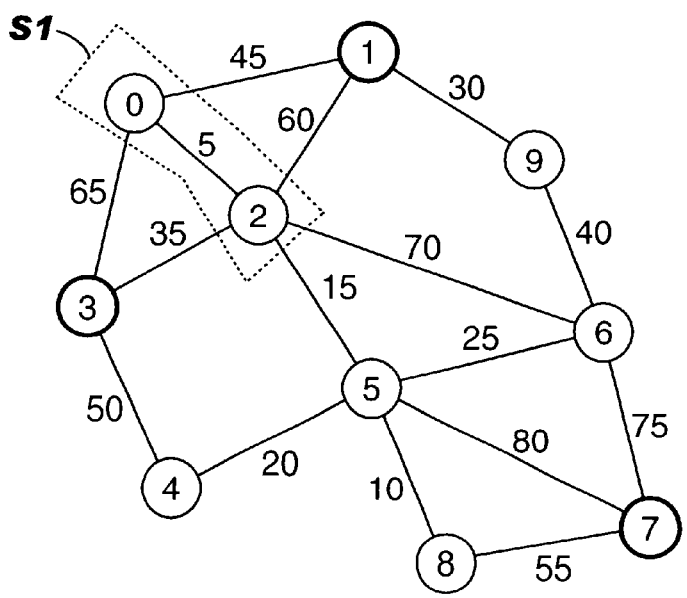
Figure 3C:
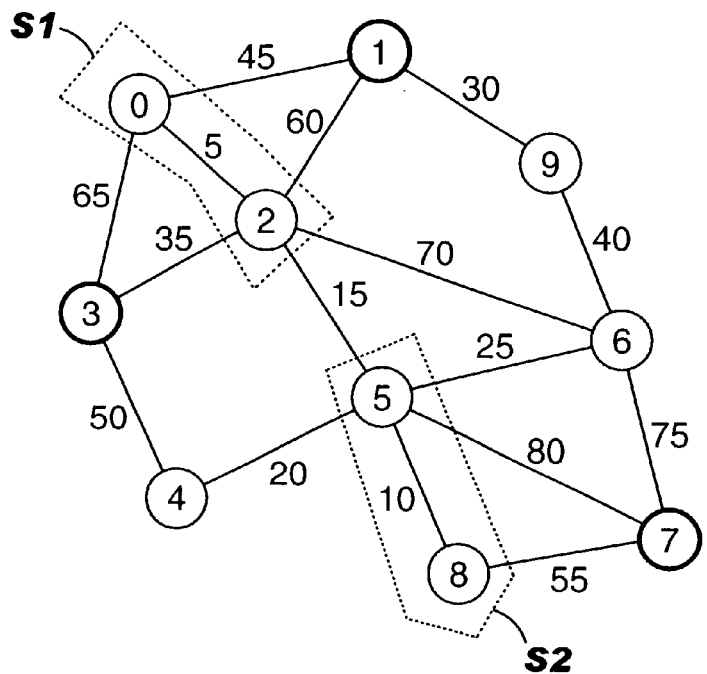
Figure 3D:
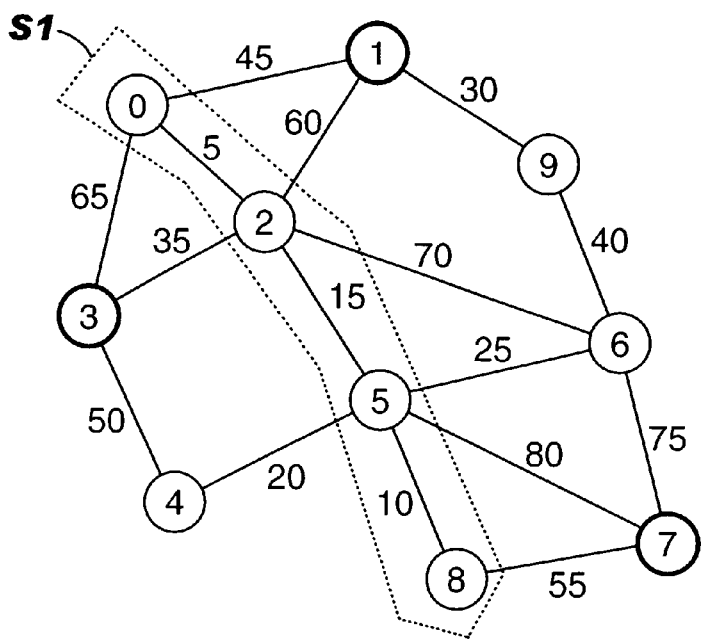
Figure 3E:
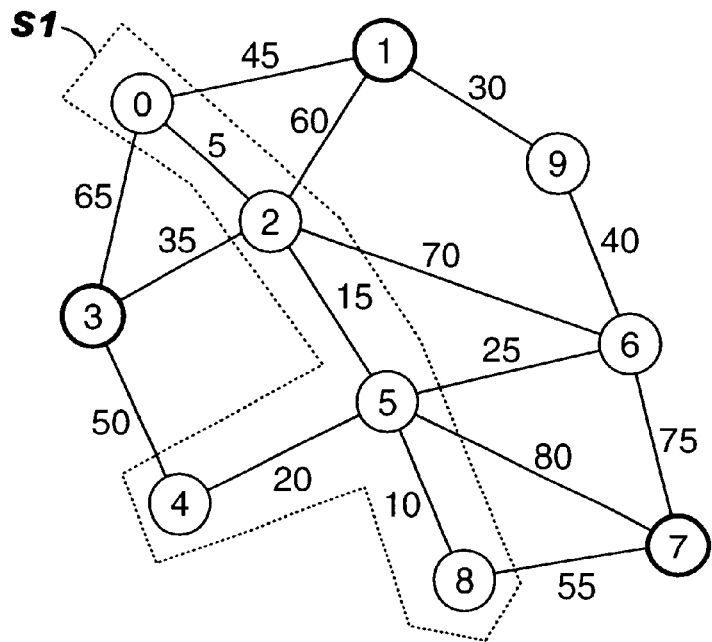
Figure 3F:
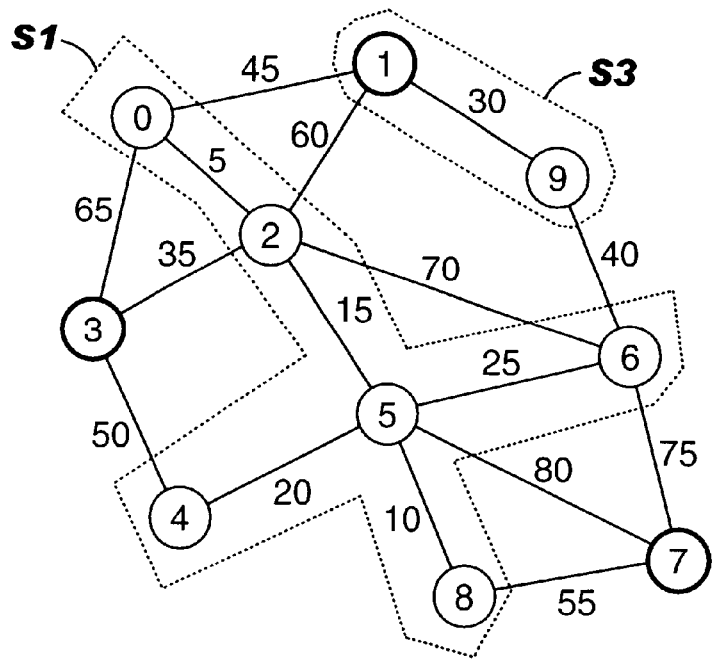
Figures 3G, 4:
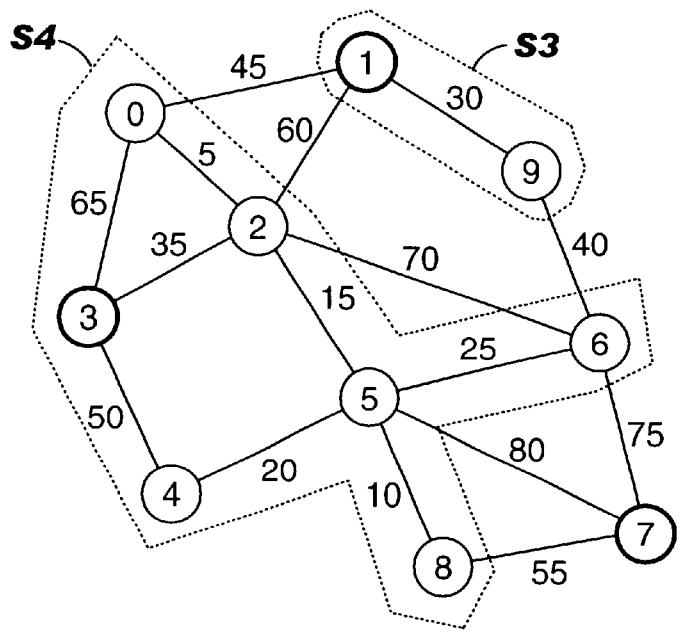
FIG. 4 is an example of a sorted list of links, in accordance with the present invention.

Then, Edge 1 (2nd row) is taken from the sorted list of links in FIG. 4. It joins vertices 5 and 8 which both have "infinity" color. The new color 4 is assigned to both of them, as shown in the table of FIG. 7. By doing so, another set S2 is defined (cf. FIG. 3C).

Then, Edge 2 is taken from the list. It joins vertices 2 and 5. Vertex 5 has color 4 while vertex 2 has color 3 (see FIG. 7). Color 3 is propagated because it is dominant. Please note that in the present example the smallest color is considered to be dominant (i.e. if two colors 'meet' the minimal color 'wins'). By propagating one of the colors, the two sets S1 and S2 are united into one set S1, as shown in FIG. 3D.

Figures 9, 10, 11, 12, 14:
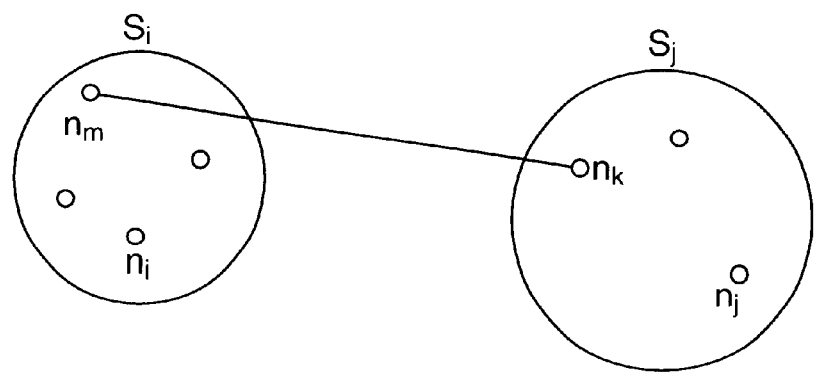

Therefore vertices 5 and 8 receive color 3, as shown in the table of FIG. 8. In a next step, the Edge 3 is taken from the sorted list of links in FIG. 4. It joins vertices 4 and 5. Vertex 5 has color 3 while vertex 4 has color "infinity". Color 3 is propagated. Therefore the vertex 4 receives the color 3, as shown in the table of FIG. 9. In other words, vertex 4 becomes a member of the set S1 (see FIG. 3E).

Now, the Edge 4 is taken from the list in FIG. 4. It joins vertices 5 and 6. Vertex 5 has color 3 while vertex 6 has color "infinity". Same as in the last step, color 3 is propagated. Vertex 6 receives color 3, as shown in the table of FIG. 10. Vertex 6 thus becomes a member of the set S1.

In the following step, the Edge 5 is taken from the sorted list of links in FIG. 4. It joins vertices 1 and 9. Vertex 1 has color 0 which is a border color that must be propagated. Therefore, vertex 9 gets color 0 (see FIG. 11). I.e., the border node's identifier is assigned to the ordinary node if the link connects a border node (Vertex 1) and an ordinary node (Vertex 9). By assigning the border node's identifier (color 0) to node 9, another set S3 is formed, as illustrated in FIG. 3F.

The Edge 6 is now taken from the sorted list of links. It joins vertices 2 and 3. Vertex 3 has color 1 which is a border color that must be propagated. Therefore all vertices having color 3 receive color 1, as indicated in the table of FIG. 12. In other words, the set of nodes S1 that carries a color 3 is united with the set of nodes that carry color 1 by assigning the color 1 to all its nodes (note that in the present example the set of nodes that carry the color 1 comprises one node only). This united set now carries the name S4, as shown in FIG. 3G.

Now, Edge 7 is taken from the list. It joins vertices 6 and 9. Both vertices have a border color. In this case, the cost matrix has to be updated. Vertex 6 has color 1 associated to border vertex 3 and vertex 9 has border color 0 associated to border vertex 1. Scanning the column of matrix (1) associated to vertex 1, the only value different from infinity is associated with the vertex 1 line. Scanning the line of matrix (1) associated to vertex 3, the only value different from infinity is associated with the vertex 3 column. Therefore, the matrix entries associated with vertex 3 and 1 are updated with the cost of edge 7. In the present example the cost of edge 7 is 40, according to FIG. 4. In other words, the restrictive cost between border nodes 1 and 3 is now known. No updates of any other entries in the cost matrix are required at this point in time, because there are no corresponding pairs of border nodes for which the cost has already been found.

$$\begin{pmatrix} & \text{vertex 1} & \text{vertex 3} & \text{vertex 7} \\ & \downarrow & \downarrow & \downarrow \\ \text{vertex 1} \rightarrow & 0 & 40 & \infty \\ \text{vertex 3} \rightarrow & 40 & 0 & \infty \\ \text{vertex 7} \rightarrow & \infty & \infty & 0 \end{pmatrix} \quad (2)$$

The Edge 8 is now taken from the sorted list of links in FIG. 4. It joins vertices 0 and 1. Both vertices have a border color. Since colors 0 and 1 have already touched during the last step, there is nothing to do. Now, the Edge 9 is taken from the list. It joins vertices 3 and 4. Both vertices have the same border color (color 1) and are member of the same set S4. Therefore, there is nothing to do and the cost between the two vertices 3 and 4 is known. Now, Edge 10 is taken from the sorted list of links. It joins vertices 7 and 8. Both vertices have a border color. Since the two colors are not yet joined the cost matrix (2) has to be updated. Vertex 7 has color 2 associated to the border vertex 7 (this is indicated in that the color 2 in the column of Vertex 7 is printed bold in the FIGS. 5–12). Vertex 8 has color 1 associated to the border vertex 3 (this is indicated in that the color 1 in the column of Vertex 3 is printed bold in the FIGS. 5–12). The matrix needs to be updated since color 1 and color 2 are dominant (border node) colors.

Now the matrix update algorithm is applied. The connecting vertices are 3 and 7. Let us scan the column of matrix (2) associated to vertex 3. The entry associated with vertex 1 is different from infinity. Scanning the row of matrix (2) associated with vertex 7, the only entry different from infinity is associated with vertex 7. Therefore the entries associated with vertices 1 and 7 are updated with the cost of edge 10 (in the present example the cost of edge 10 is 55, cf. FIG. 4). The second entry in vertex 3 column of matrix (2) different from infinity is associated with vertex 3. Once again, in vertex 7 row of matrix (2), the only entry different from infinity is associated with vertex 7. Therefore the entries associated with vertices 3 and 7 are updated with the cost of edge 10, as shown in the following matrix:

$$\begin{pmatrix} & \text{vertex 1} & \text{vertex 3} & \text{vertex 7} \\ & \downarrow & \downarrow & \downarrow \\ \text{vertex 1} \rightarrow & 0 & 40 & 55 \\ \text{vertex 3} \rightarrow & 40 & 0 & 55 \\ \text{vertex 7} \rightarrow & 55 & 55 & 0 \end{pmatrix} \quad (3)$$

Since there are no more infinity entries in the above cost matrix the algorithm stops. The cost matrix (3) now allows determination of the cost between any pair of border vertices. The cost between vertex 1 and vertex 7 is 55.

Figure 15:
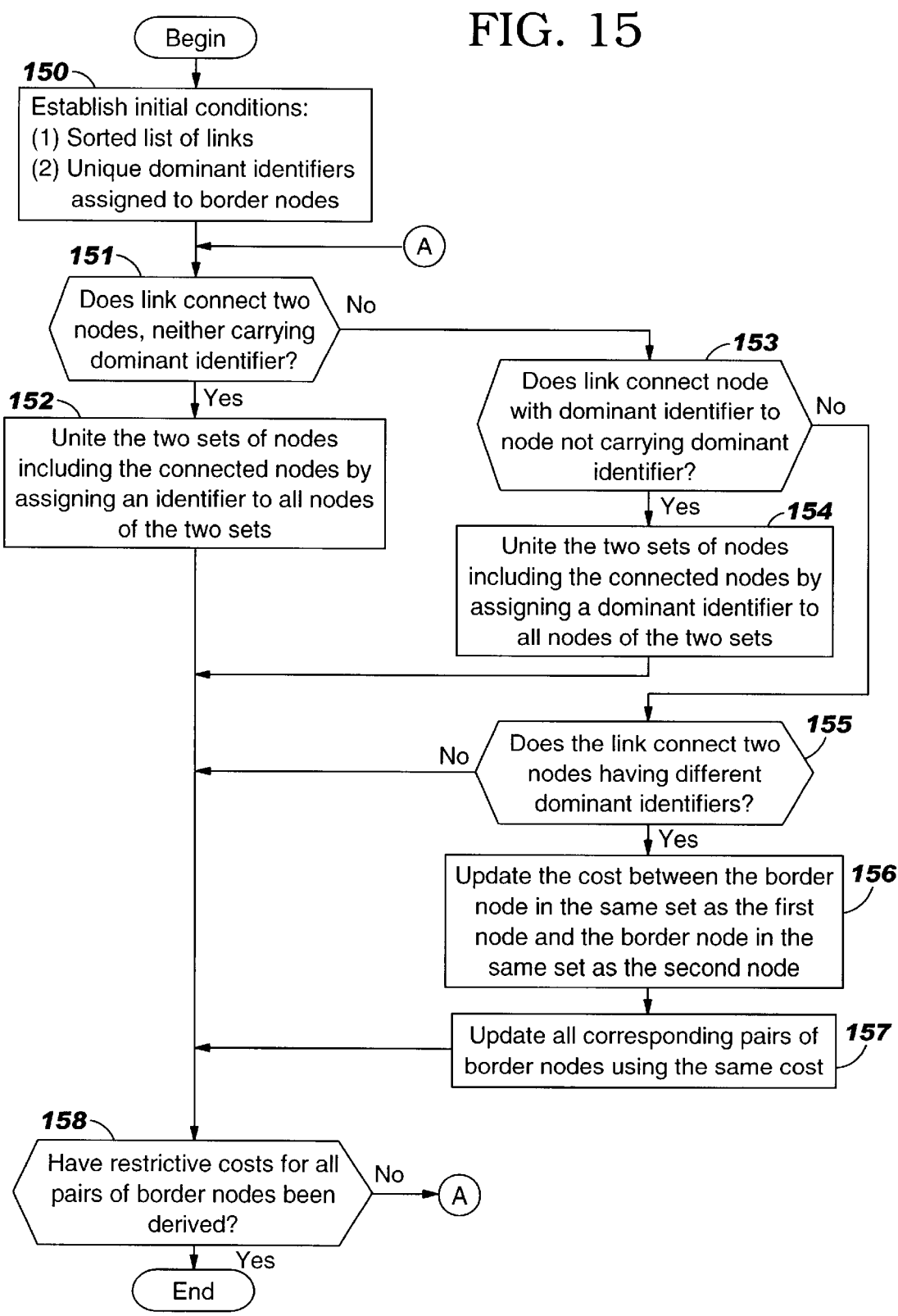
FIG. 15 is a schematic flow chart which illustrates the basic steps of an algorithm in accordance with the present invention.

In the following, the usage of the inventive algorithm is explained using other words. There are three different cases. After some initialization (see box 150 in FIG. 15) the algorithm of FIG. 14 runs into a loop which is repeated until the restrictive cost between all pairs of border nodes has been derived. This loop comprises the boxes 151 through 157 shown in FIG. 15.

Let p(v) be the prime color of vertex v (P(v)=C(v) ∈ F) if it has one.

1. case: Both nodes $n_i$ and $n_j$ which are connected by a link taken from the sorted list of links carry dominant (prime) identifiers (boxes 155–157).

1. If $p(n_i)=p(n_j)$, then the cost matrix does not need to be updated;

2. If $p(n_i) \neq p(n_j)$, then the cost C has been found and the cost matrix is updated (i.e. the matrix update algorithm is applied) (boxes 156–157).

Matrix update algorithm: Let $S_i$ be the set containing node $n_i$ (see FIG. 14), as well as the nodes whose cost to node $n_i$ have already been found. Let $S_j$ be the set containing node $n_j$, as well as the nodes whose cost to node $n_j$ have already been found. All possible entries ($n_m$, $n_k$) in the cost matrix are updated with cost c where $n_m \in S_i$, $n_k \in S_j$. All these possible entries are updated, because the cost (transitivity) not only between the two sets $S_i$ and $S_j$ is found, but also between other pairs of border nodes is found. These other pairs of border nodes are all border nodes whose respective sets are connected to said set $S_i$ and all border nodes whose respective sets are connected to said second set $S_j$.

2. case: One node $n_i$ carries a dominant (prime) identifier and one node $n_j$ does not carry a dominant (prime) identifier (boxes 153–154). In this case, the whole set of nodes of the node that carries the dominant identifier and the whole set of nodes of the node that does not carry a dominant identifier are united by assigning the dominant identifier to all of the nodes of these sets.

3. case: Both nodes $n_i$ and $n_j$ do not carry a dominant (prime) identifier (boxes 151–152). In this case, the whole sets of nodes of both nodes are united under one identifier. If none of the two nodes have an identifier (or an "infinity" identifier), then a new unique identifier is assigned to all the nodes of the two sets. Where both nodes had an identifier, one may take either one of them, according to a certain rule. This rule has to respect one property, namely the assigned identifier has to be unique within the peer group under consideration. A typical rule could be to take the identifier of the biggest set (the biggest set 'wins'). This is advantageous because only very few changes have to be made in the table. Likewise, either the largest or smallest identifier might win. One might also apply a rule that randomly selects the identifier which wins.

The method according to the present invention allows determination of the cost matrix of a PNNI peer group more quickly than with conventional methods. This cost matrix can be used to calculate a path from a source node to a destination node. The computation of the cost matrix is efficient and thus requires less CPU power or time. This means that a conventional node can process more calls per second, i.e. the node can route more packets or frames. In other words, the present invention helps to unload the CPU of a node such that it can take care of actual traffic (e.g. the call setup rate can be increased) instead of path determination and cost computation issues.

New nodes can be designed that require smaller CPUs because less CPU power is needed for the computation of the cost matrix. Likewise, the CPU power can be used for other purposes.

Depending on the application, the inventive scheme might be used to compute the cost matrix in one node of a network, domain, or peer group and to flood the cost matrix to all other nodes, or each node can compute the cost matrix.

Figure 16:
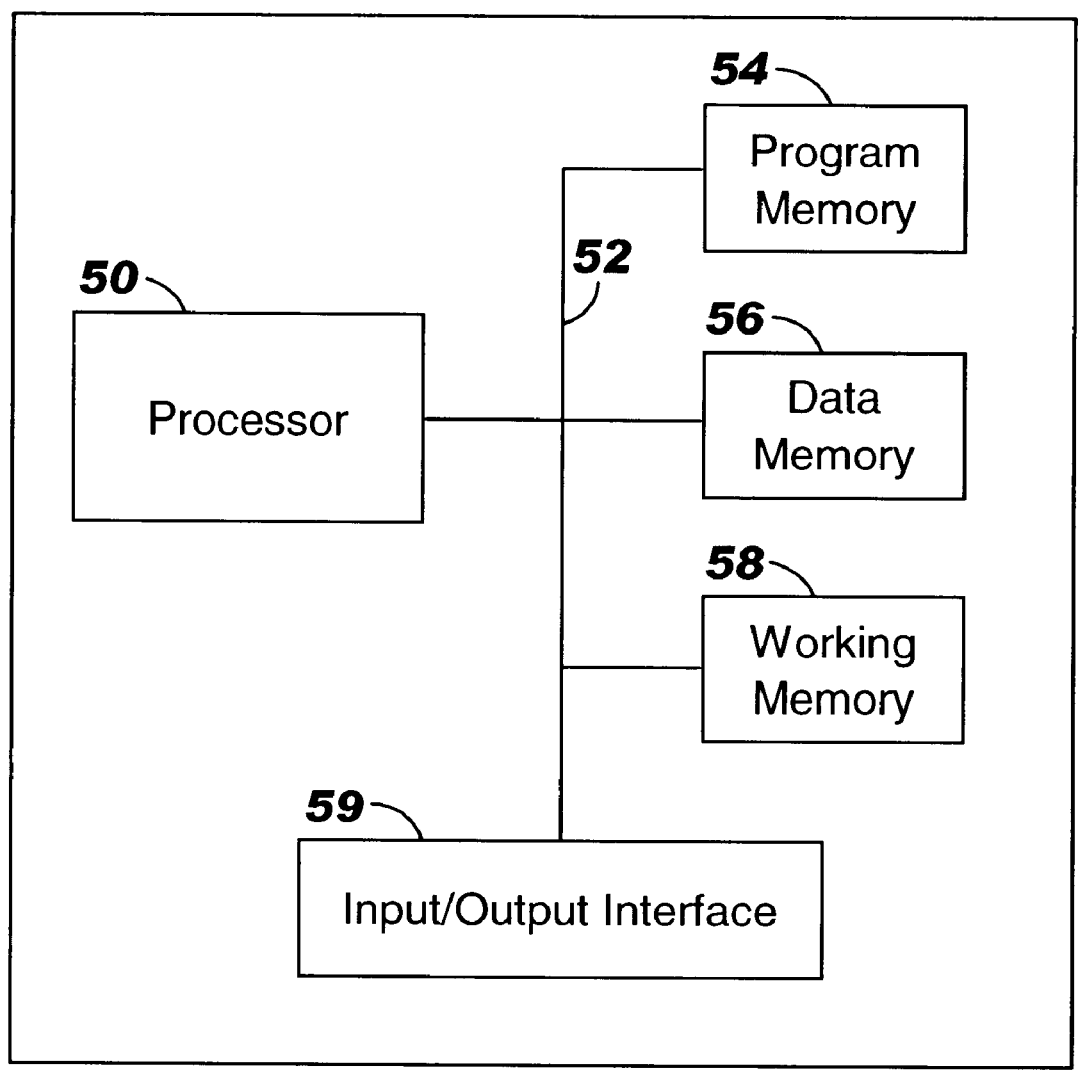
FIG. 16 is a block diagram of the major hardware components of a node in which the inventive method can be executed.

Referring now to FIG. 16, a typical node is described. The node comprises a processor 50 which is associated through a bus 52 with program memory elements of computer usable media 54. It also has data memory elements 56 in which the reachabilities and identities of the other switches of the peer group are retained, working memory elements and a input/output interface 59 for the receipt and transfer of the information on the network.

In a PNNI network packets or frames are sent from a source node to a destination node by means of source routing. That is, the source node indicates in the packet or frame what path it wants the packet or frame to follow. For this purpose, the source node needs to be able to determine the optimal path. If the source node holds a copy of the cost matrix, it needs to find the path with lowest cost within this matrix. The lowest cost in the matrix is assigned to an edge (link) between two vertices. These two vertices are then used by the source node for routing the packet or frame peer goup-by-peer group through the whole network to the destination node.

Calculations have shown that the cost matrix should be recalculated if a link changes or is added which has a cost lower than the lowest cost in the current cost matrix.

One possible application of the present algorithm was described in connection with the above sample graph. The novel algorithm is used to compute the cost matrix associated with the complex node representation of a peer group in a PNNI network. The proposed algorithm has a complexity which is linear to the number of edges in the peer group to be summarized. There are similar algorithms that can be used instead of the one discussed above.

What is claimed is:

1. Method for computation of a restrictive cost between pairs of border nodes of a PNNI peer group, said peer group comprising nodes and links connecting two nodes, some of the nodes being border nodes, comprising the steps:
   1) maintaining a sorted list of such links sorted according to their cost,
   2) assigning unique dominant identifiers to each one of said border nodes, and
   3) taking such a link from said sorted list,
      a. if the link connects two nodes neither of which carries a dominant identifier, uniting the two sets of nodes of these two nodes by assigning an identifier to all nodes of the two sets, or
      b. if the link connects a node with a dominant identifier and a node which does not carry a dominant identifier, then uniting the two sets of nodes of these two nodes assigning a dominant identifier to all nodes of the two sets, or
      c. if the link connects a first node which carries a dominant identifier and a second node which carries a different dominant identifier, then updating the cost between the border node which belongs to the same set of nodes as the first node and the border node which belongs to the same set of nodes as the second node, and updating with the same cost all corresponding pairs of border nodes.
      d. continue with step 3) until the restrictive cost between all pairs of border nodes has been derived.

2. The method of claim 1, wherein said corresponding pairs of border nodes are
   all border nodes for which a cost to the border node which belongs to the same set of nodes as the first node has already been found and all border nodes for which a cost to the border node which belongs to the same set of nodes as the second node has already been found, and
   all border nodes for which a cost to the border node which belongs to the same set of nodes as the first node has already been found and the border node which belongs to the same set of nodes as the second node has already been found, and
   all border nodes for which a cost to the border node which belongs to the same set of nodes as the second node has already been found and the border node which belongs to the same set of nodes as the first node has already been found.

3. The method of claim 1, wherein said sorted list of links is a logically sorted list, preferably a link list.

4. The method of claim 1, wherein said identifier which is assigned to all nodes of the two sets in step a. is the identifier of either one of the two nodes that were connected by the link.

5. The method of claim 1, wherein said identifier which is assigned to all nodes of the two sets in step a. is a unique identifier.

6. The method of claim 1, wherein said dominant identifier which is assigned to all nodes of the two sets in step b. is the dominant identifier of the node that was connected by the link to the node which does not carry a dominant identifier.

7. The method of claim 1, wherein some identifiers are known to be dominant (prime).

8. The method of claim 4, wherein said dominant identifiers are marked in said sorted list of links, or where there is a list of dominant identifiers.

9. The method of claim 1, wherein said sorted list of links is updated if a link changes.

10. Method for computation of a restrictive cost between pairs of border nodes of a PNNI peer group, said peer group comprising nodes, some of the nodes being border nodes, and links each connecting an individual pair of nodes, comprising the steps:
   a. maintaining a sorted list of such links sorted according to their restrictive cost C,
   b. forming logical sets of nodes
      by taking one such link after the other from said list starting with the cheapest cost C and assigning an identifier to the two nodes connected by the respective link, whereby the nodes of a set of nodes carry a dominant unique identifier if a border node is a member of the respective set, or a unique identifier if there is no border node being a member of the respective set,
      uniting two sets, if such a link connects a node of a first set and a node of a second set, by assigning a dominant unique identifier to all nodes of both sets if either nodes of the first or the nodes of the second set carry a dominant unique identifier, or by assigning a unique identifier to all nodes of both sets if neither the nodes of the first nor the nodes of the second set carry a dominant unique identifier, c. applying a matrix update algorithm if such link connects a node of a first set and a node of a second set that both already carry dominant unique identifiers.

11. The method of claim 10, wherein said matrix update algorithm comprises the steps a. updating the cost between a pair of border nodes with the cost C of a link if said link connects a node of a first set and a node of a second set that both already carry dominant unique identifiers, and b. updating the cost between all border nodes whose respective sets are connected to said first set and all border nodes whose respective sets are connected to said second set with said cost C.

12. The method of claim 10 being used for computation of the restrictive cost of traversing said PNNI peer group between each pair of border nodes.

13. Method for computation of an optimal path in a PNNI network comprising carrying out the steps of claim 1 or 10 to compute the restrictive cost between all pairs of border nodes, and determining said optimal path between a source node and a destination node by selecting the link with the lowest cost between a pair of border nodes.

14. Method for routing a packet or frame from a source node to a destination node using an optimal path in a PNNI network comprising carrying out the steps of claim 1 or 10 to compute the restrictive cost between all pairs of border nodes, and determining said optimal path between a source node and a destination node by selecting the link with the lowest cost between a pair of border nodes, routing said packet or frame through said pair of border nodes.

15. Apparatus for computation of a restrictive cost between pairs of border nodes of a PNNI peer group, said PNNJ peer group comprising nodes and links connecting individual pairs of nodes, some of the nodes being border nodes, the apparatus comprising:

1) a sorted list of such links sorted according to their cost, 2) a unit for assigning unique dominant identifiers to each one of said border nodes, and 3) processing unit which takes one such link after the other from said sorted list until the restrictive cost between all pairs of border nodes has been derived, a. to unite the two sets of nodes of these two nodes by assigning an identifier to all nodes of the two sets, if the link connects two nodes neither of which carries a dominant identifier, or b. to unite the two sets of nodes of these two nodes by assigning a dominant identifier to all nodes of the two sets, if the link connects a node with a dominant identifier and a node which does not carry a dominant identifier, or c. to update the cost of the link that connects the first node and the second node, and update with the same cost all corresponding pairs of nodes, said corresponding pair of nodes being all nodes for which a cost to the first node has already been found and all nodes for which a cost to the second node has already been found, if the link connects a first node which carries a dominant identifier and a second node which carries a dominant identifier.

16. The apparatus for computation of a restrictive cost according to claim 15 being part of a node.

17. The apparatus for computation of a restrictive cost according to claim 15, wherein said sorted list of links is maintained in memory.

18. The apparatus for computation of a restrictive cost according to claim 15, wherein said processing unit is a processor in combination with a instruction code that controls the operation of the processor.

19. Apparatus according to claim 10 where the unique identifier assigned to two sets of nodes is the unique identifier of the largest of the two sets of nodes.

* * * * *